(12) United States Patent
Horoszczak et al.

(10) Patent No.: US 11,754,341 B2
(45) Date of Patent: Sep. 12, 2023

(54) HEAT EXCHANGER

(71) Applicant: Hamilton Sundstrand Corporation, Charlotte, NC (US)

(72) Inventors: Adam Horoszczak, Wroclaw (PL); Rafal Lewandowski, Zarow (PL)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 338 days.

(21) Appl. No.: 16/719,582

(22) Filed: Dec. 18, 2019

(65) Prior Publication Data
US 2021/0003349 A1 Jan. 7, 2021

(30) Foreign Application Priority Data
Jul. 5, 2019 (EP) .................................. 19461554

(51) Int. Cl.
| | |
|---|---|
| *F28D 1/053* | (2006.01) |
| *F28F 1/04* | (2006.01) |
| *B33Y 10/00* | (2015.01) |
| *B33Y 80/00* | (2015.01) |
| *F28F 9/02* | (2006.01) |

(52) U.S. Cl.
CPC ............ *F28D 1/05383* (2013.01); *F28F 1/04* (2013.01); *B33Y 10/00* (2014.12); *B33Y 80/00* (2014.12); *F28F 2009/029* (2013.01)

(58) Field of Classification Search
CPC ... F28D 1/05383; F28F 1/04; F28F 2009/029; B33Y 10/00; B33Y 80/00
USPC ....................................................... 165/110
See application file for complete search history.

(56) References Cited

U.S. PATENT DOCUMENTS

| | | | | |
|---|---|---|---|---|
| 910,192 | A * | 1/1909 | Grouvelle | F28F 13/12 |
| | | | | 138/38 |
| 1,277,526 | A * | 9/1918 | Zimmermann | F28D 1/0341 |
| | | | | 165/153 |
| 1,618,485 | A * | 2/1927 | Skinner | F28F 1/04 |
| | | | | 165/151 |

(Continued)

FOREIGN PATENT DOCUMENTS

| | | | |
|---|---|---|---|
| EP | 3239642 A1 | 11/2017 | |
| FR | 2812718 A1 | 2/2002 | |
| FR | 2812718 A1 * | 2/2002 | ............... F28D 7/16 |

OTHER PUBLICATIONS

European Search Report for Application No. 19461554.8, dated Jan. 3, 2020, 9 pages.

*Primary Examiner* — Tho V Duong
*Assistant Examiner* — Raheena R Malik
(74) *Attorney, Agent, or Firm* — CANTOR COLBURN LLP

(57) ABSTRACT

A heat exchanger for exchanging heat between first and second fluids, comprising first fluid channels extending in a longitudinal direction for carrying a first fluid, and second fluid channels extending in the longitudinal direction for carrying a second fluid, wherein the first and second fluid channels are arranged in an alternating pattern such that each of a plurality of the first channels is located laterally between second channels and each of a plurality of second channels is located laterally between first channels, and wherein the second fluid channels extend longitudinally beyond ends of the first fluid channels, and have ends that decrease in cross section such that the first fluid is able to pass around and between the ends of the second channels.

14 Claims, 6 Drawing Sheets

(56) References Cited

U.S. PATENT DOCUMENTS

| | | | | |
|---|---|---|---|---|
| 1,946,234 | A * | 2/1934 | Price | F28F 9/013 |
| | | | | 165/162 |
| 4,730,669 | A * | 3/1988 | Beasley | F28F 9/182 |
| | | | | 165/151 |
| 5,046,555 | A * | 9/1991 | Nguyen | F28F 9/182 |
| | | | | 165/173 |
| 5,345,674 | A * | 9/1994 | Knecht | F28D 1/0535 |
| | | | | 165/173 |
| 5,456,311 | A * | 10/1995 | Knecht | F28D 1/0535 |
| | | | | 165/151 |
| 5,579,834 | A * | 12/1996 | Chiba | F28F 9/182 |
| | | | | 165/173 |
| 8,459,342 | B2 * | 6/2013 | O'Donnell | F24H 9/0026 |
| | | | | 165/109.1 |
| 9,693,489 | B2 * | 6/2017 | Park | F28D 1/05383 |
| 9,976,815 | B1 * | 5/2018 | Roper | F28D 7/08 |
| 10,107,555 | B1 * | 10/2018 | Miller | F28D 7/16 |
| 10,203,169 | B2 * | 2/2019 | Ghioni | B33Y 80/00 |
| 10,371,462 | B2 * | 8/2019 | Vos | B23P 15/26 |
| 10,914,528 | B2 * | 2/2021 | Wunning | F28D 7/1692 |
| 11,156,381 | B2 * | 10/2021 | Baljekar | F04D 29/60 |
| 2016/0128240 | A1 * | 5/2016 | Park | H05K 7/20927 |
| | | | | 361/699 |
| 2016/0290738 | A1 * | 10/2016 | Kupiszewski | F28F 13/12 |
| 2017/0089643 | A1 | 3/2017 | Arafat | |
| 2017/0146305 | A1 * | 5/2017 | Kuczek | F28F 9/0268 |
| 2017/0198976 | A1 | 7/2017 | Turney et al. | |
| 2017/0198977 | A1 | 7/2017 | Herring et al. | |
| 2017/0198978 | A1 | 7/2017 | Kuczek et al. | |
| 2017/0198979 | A1 * | 7/2017 | St. Rock | F28F 21/062 |
| 2017/0205146 | A1 | 12/2017 | Lopes | |
| 2017/0370652 | A1 | 12/2017 | Lopes | |
| 2018/0043482 | A1 | 2/2018 | Vos et al. | |
| 2020/0309459 | A1 * | 10/2020 | Streeter | F28F 1/006 |

* cited by examiner

HEAT EXCHANGER

FOREIGN PRIORITY

This application claims priority to European Patent Application No. 19461554.8 filed Jul. 5, 2019, the entire contents of which is incorporated herein by reference.

FIELD

The present disclosure generally relates to heat exchangers and methods of making heat exchangers.

BACKGROUND

Heat exchangers include two flow paths located proximate but fluidly isolated from one another, such that a cold fluid can cool a hotter fluid or a hot fluid can heat a colder fluid. The channels through which the flow paths flow may include primary heat exchange surfaces, wherein a single wall separates hot and cold fluids on either side of the wall and heat exchange occurs between the fluids across the wall, and secondary heat exchange surfaces, wherein heat is conducted along a member to another location to be cooled.

SUMMARY

A first aspect of the present disclosure provides a heat exchanger for exchanging heat between first and second fluids comprises first fluid channels extending in a longitudinal direction for carrying a first fluid, and second fluid channels extending in the longitudinal direction for carrying a second fluid, wherein the first and second fluid channels are arranged in an alternating pattern such that each of a plurality of the first channels is located laterally between second channels and each of a plurality of second channels is located laterally between first channels, and wherein the second fluid channels extend longitudinally beyond ends of the first fluid channels, and have end portions that decrease in cross sectional area such that the first fluid is able to pass around and between the end portions of the second fluid channels.

For the avoidance of doubt, the lateral direction is orthogonal to the longitudinal direction.

The end portions of the second fluid channels may decrease in cross sectional area from locations coinciding with the ends of the first fluid channels to the distal ends of the second fluid channels.

The second fluid channels may extend longitudinally beyond the ends of the first fluid channels at only one longitudinal end of the first fluid channels, e.g. the upstream end or the downstream end. Alternatively, the second fluid channels may extend longitudinally beyond both of the ends of the first fluid channels. The first fluid channels and second fluid channels may extend parallel to one another, in the longitudinal direction.

The channels are arranged such that the first fluid supplied to the plurality of first fluid channels is fluidly isolated from the second fluid supplied to the plurality of second fluid channels.

Each of the plurality of first fluid channels may have a first length, and each of the plurality of second channels may have a second length, wherein the second length is greater than the first length.

Each of the plurality of second fluid channels may taper or otherwise change to a smaller cross sectional area beyond the ends of the first fluid channels.

The cross sections of the plurality of first fluid channels a may be substantially rhombus shaped, and the cross sections of the plurality of second channels may be substantially rhombus shaped at least for the portions of their lengths that extend between the ends of the first fluid channels.

Each of the second channels may have a different cross-sectional shape in its end portions to the cross-sectional shape in its central portion between the end portions. For example, the central portion may be rhombus shaped, and the end portions may be oval or circular shaped.

The cross sections are taken perpendicular to the longitudinal axis. The cross sections of the plurality of first fluid channels and the plurality of second fluid channels may be identical, i.e. be the same size and shape, in the portion of the heat exchanger in which the first channels extend.

The rhombus shapes can tessellate such that each of the plurality of first fluid channels is surrounded on all four sides by a second fluid channel, and vice versa. This results in every wall of the channels (aside from those located at the outer edge of the heat exchanger) being a primary heat transfer surface, i.e. located between a first channel and a second channel.

The rhombus shapes may include flattened points, to aid in the manufacturing process.

The cross-sectional shape of each of the second fluid channels may remain the same, i.e. during tapering, the cross section may remain a substantially rhombus shape.

However, the cross-sectional shape of the channels may be a shape other than a rhombus.

Some or all of each of the plurality of first and second fluid channels may comprise a wave-shape in the longitudinal direction. This induces fluid turbulence, which aids in the heat exchange.

Alternatively, each of the plurality of first and second fluid channels may extend straight in the longitudinal direction.

The heat exchanger may comprise an upstream parting wall contacting upstream ends of the second fluid channels, wherein a first inlet chamber is defined between the upstream parting wall, an outer housing of the heat exchanger and upstream ends of the first fluid channels, and wherein the outer housing comprises an first inlet into the first inlet chamber for supplying the first fluid.

The first inlet chamber is configured such that first fluid passed into the inlet flows around and between the upstream ends of the second fluid channels and into the upstream ends of the first fluid channels.

The first inlet may be arranged in the top of the heat exchanger.

The heat exchanger may comprise a second inlet chamber on an opposite side of the upstream parting wall to the first inlet chamber, wherein the upstream parting wall has orifices therein such that second fluid supplied to the second inlet chamber can pass through the upstream parting wall, into and through the second fluid channels.

The heat exchanger may comprise a second inlet in the outer housing of the heat exchanger for supplying the second fluid into the second inlet chamber.

The heat exchanger may comprise a downstream parting wall contacting downstream ends of the second fluid channels, wherein a first outlet chamber is defined between the downstream parting wall, an outer housing of the heat exchanger and downstream ends of the first fluid channels, and wherein the outer housing comprises a first outlet from the first outlet chamber.

The first outlet chamber is configured such that first fluid passed into the chamber flows around and between the downstream ends of the second fluid channels and out of the chamber through the first outlet.

The first outlet may be arranged in the bottom of the heat exchanger.

The heat exchanger may comprise a second outlet chamber on an opposite side of the downstream parting wall to the first outlet chamber, wherein the downstream parting wall has orifices therein such that the second fluid exiting the second fluid channels can pass into the second outlet chamber.

The outer housing may comprise a second outlet arranged to allow the second fluid to exit the second outlet chamber.

It is contemplated that the end portions of the second fluid channels need not decrease in cross-sectional area (relative to the central portions of those channels) in order that the first fluid can pass around and between the second fluid channels.

Accordingly, the present disclosure also provides a heat exchanger for exchanging heat between first and second fluids, comprises first fluid channels extending in a longitudinal direction for carrying a first fluid, and second fluid channels extending in the longitudinal direction for carrying a second fluid, wherein the first and second fluid channels are arranged in an alternating pattern such that each of a plurality of the first channels is located laterally between second channels and each of a plurality of second channels is located laterally between first channels, and wherein the second fluid channels have end portions that extend longitudinally beyond ends of the first fluid channels, and wherein one or both of the end portions of each second fluid channel has a different cross sectional shape to the portion of the second fluid channel between the end portions and such that the first fluid is able to pass around and between the end portions of the second fluid channels.

The end portions may have the same cross sectional area as the portion of the second fluid channel between the end portions, or may have a decreased cross-sectional area.

The portion of each of the second fluid channels, located between the end portions, may have a rhombus shaped cross-section, and one or both of the end portions may have an oval or circular shaped cross-section.

The shape change may be gradual along the second fluid channel, or may be stepped.

The heat exchanger may comprise any of the features of the above described first and aspect of the present disclosure (except that the end portions of the second fluid channels need not necessarily decrease in in cross-sectional area.

The present disclosure also provides a method of forming the above described heat exchanger comprises forming the heat exchanger in the longitudinal direction using additive manufacturing.

The additive manufacturing may be 3D printing.

BRIEF DESCRIPTION OF DRAWINGS

Various embodiments will now be described, by way of example only, and with reference to the accompanying drawings in which.

DETAILED DESCRIPTION

Figure 1:
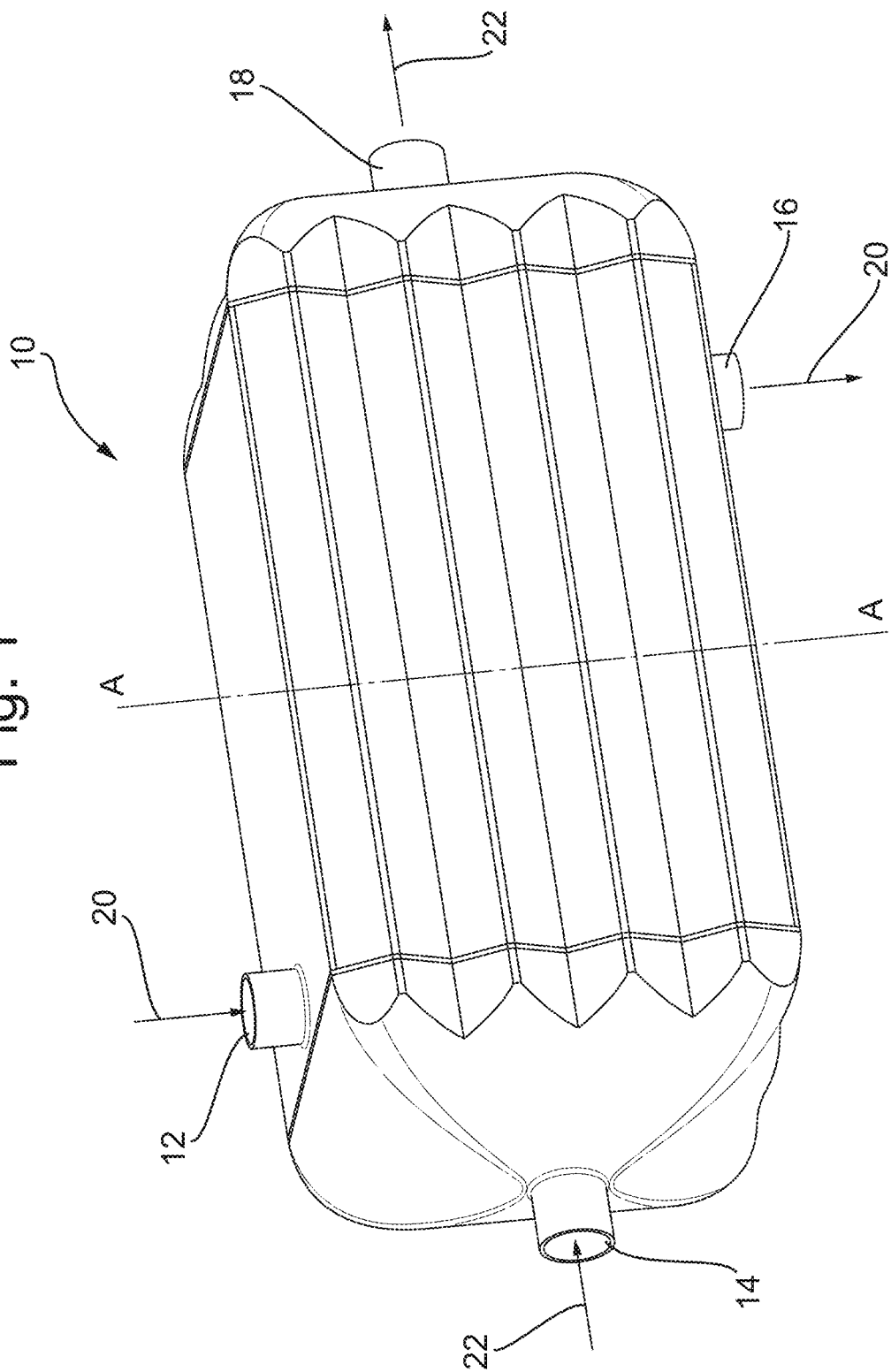
FIG. 1 shows a heat exchanger in accordance with an embodiment of the present disclosure.

FIG. 1 shows an embodiment of an elongated heat exchanger 10 in accordance with the present disclosure. The heat exchanger 10 is shown having a substantially square cross section in a plane that is orthogonal to the longitudinal axis. However, the heat exchanger 10 may have any suitable cross section, for example depending on the space available where it is desired to be installed. For example, it may have a substantially C-shaped cross section. As will be described below, the heat exchanger includes two flow paths, which are fluidly isolated from one another, i.e. the fluids are maintained separate and do not intermix. The heat exchanger 10 includes a first inlet 12 and a first outlet 16 relating to a first flow path for a first fluid, and a second inlet 14 and a second outlet 18 relating to a second flow path for a second fluid. In use, a first stream of fluid 20 will flow through the first flow path from the first inlet 12 to the first outlet 16, and a second stream of fluid 22 will flow through the second flow path from the second inlet 14 to the second outlet 18. The temperature differential between the two streams of fluid will be reduced along their flow paths as the hot fluid exchanges its heat energy to the cold fluid as the fluids progress to the outlets 16,18: i.e. the hotter fluid will become cooler, and the cooler fluid will become hotter. For the avoidance of doubt, the first fluid may be in gaseous and/or liquid form for at least part of the first flow path; and/or the second fluid may be in gaseous and/or liquid form for at least part of the second flow path.

Figure 2:
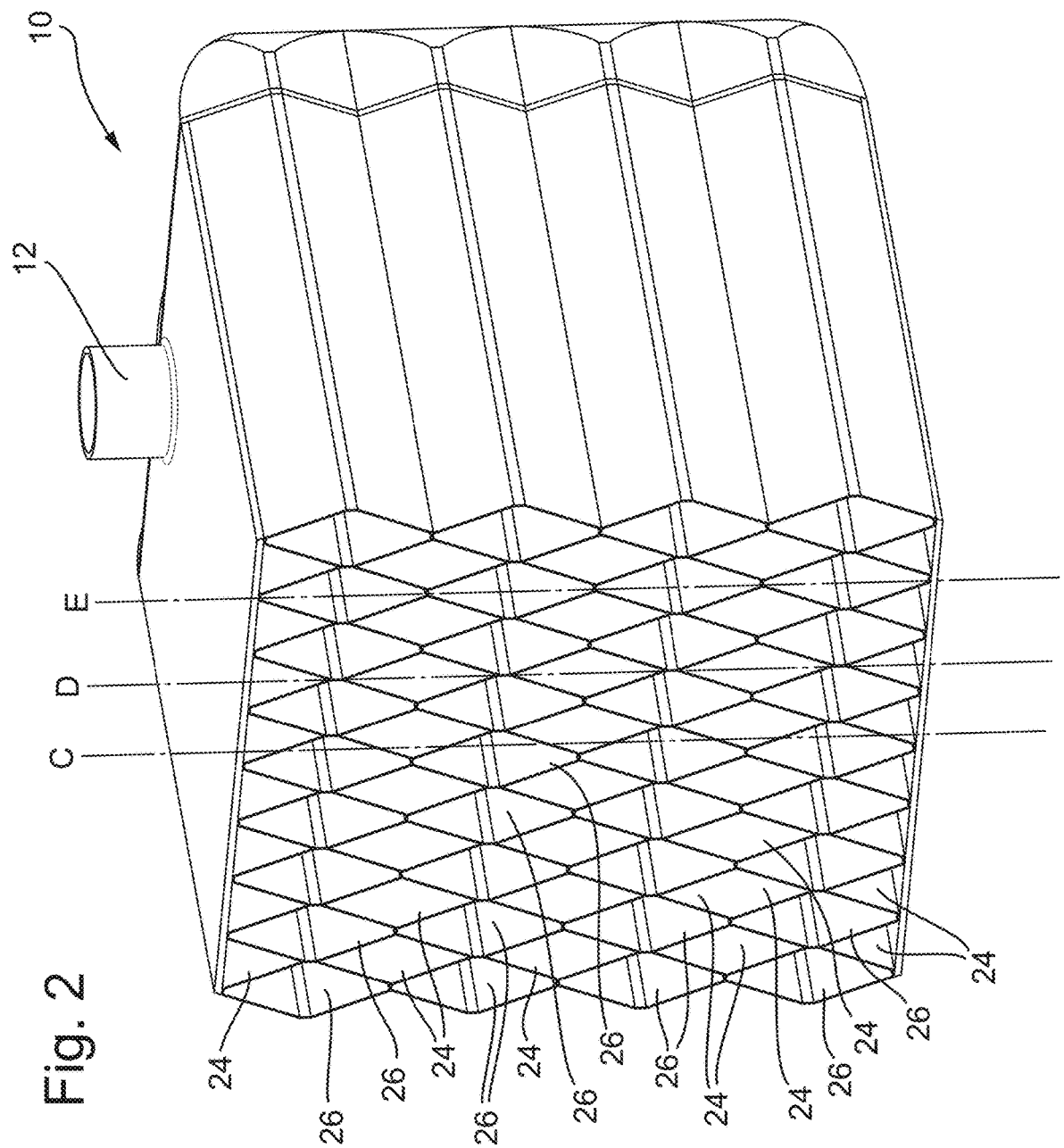
FIG. 2 shows a cross sectional view of the heat exchanger of FIG. 1 that would be seen if it was cut along its width.

FIG. 2 shows a cross sectional view of the upstream portion of the heat exchanger of FIG. 1 that would be seen if it was cut along its width, i.e. cut in a plane defined by the width direction and line A of FIG. 1. The heat exchanger includes a plurality of fluid channels 24,26. Each channel is associated with one of the first and second flow paths, i.e. the ends of any given channel are either in communication with first fluid inlet 12 and first fluid outlet 16 or are alternatively in communication with second fluid inlet 14 and second fluid outlet 18. A plurality of first channels 24 form part of the first flow path, and a plurality of second channels 26 form part of the second flow path. Each of the first and second channels 24,26 may have a substantially diamond or rhombus cross-sectional shape (in the plane orthogonal to the longitudinal axis). The plurality of first channels 24 are arranged laterally (i.e. radially) between the plurality of second channels 26, and vice versa, such that each wall of each channel is a primary heat exchange surface, aside from for the channels at the radial edges of the heat exchanger 10. In other words, four walls of each of the plurality of first channels also form the walls of second channels, and vice four walls of each of the plurality of second channels also form the walls of first channels, except for the channels located at the radial edges of the heat exchanger 10. This provides for efficient heat exchange between the channels.

Figure 3:
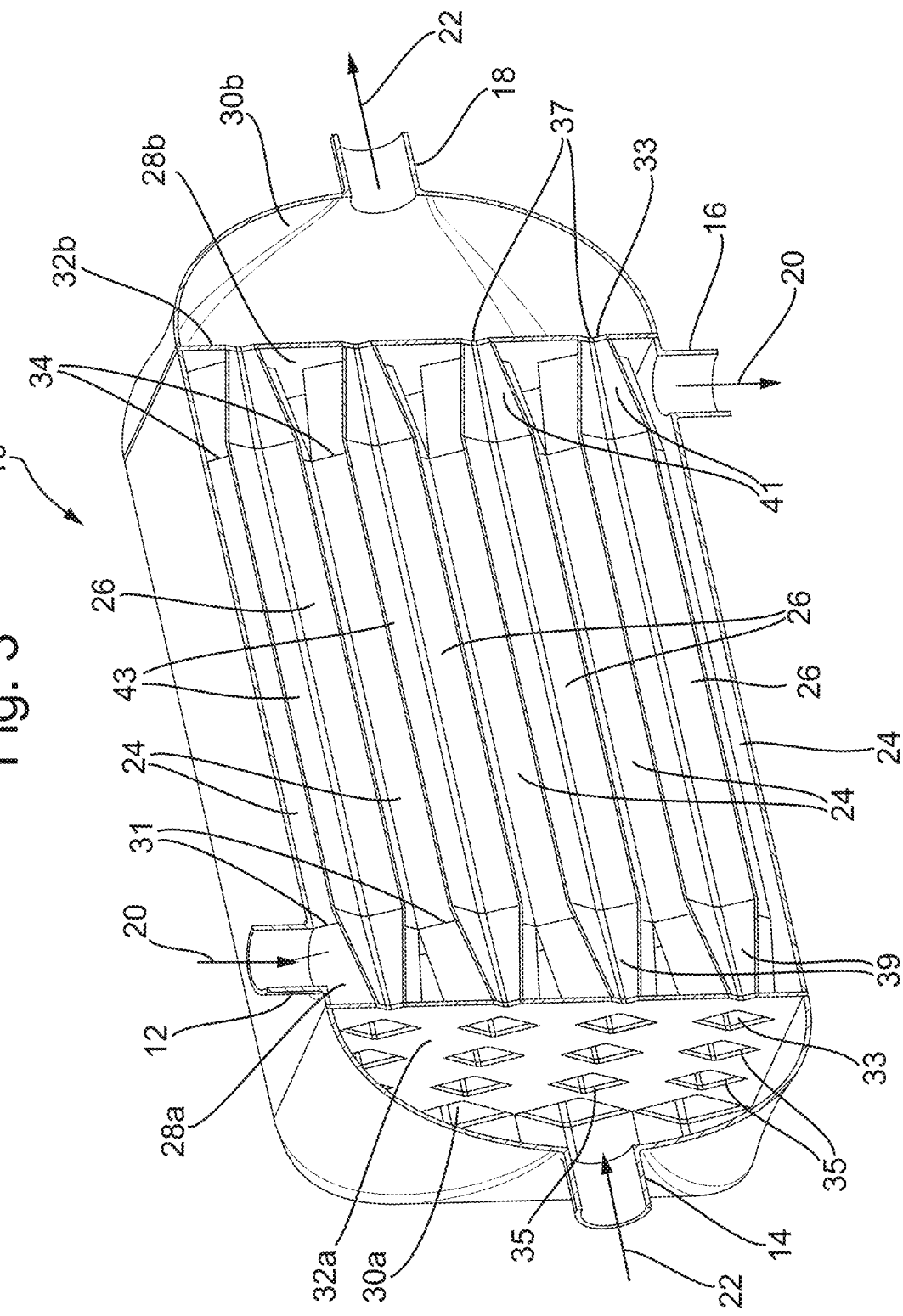
FIG. 3 shows a cross sectional view of the heat exchanger of FIG. 1, that would be seen if it was cut along its length.

FIG. 3 shows a cross sectional view of the heat exchanger of FIGS. 1 and 2, that would be seen if it was cut along its length in a plane defined by the longitudinal axis and line C in FIG. 2. First and second channels 24 and 26 extend longitudinally through the heat exchanger, parallel to one another. In longitudinal end portions of the heat exchanger, each second flow channel 26 tapers such that its cross section becomes smaller in a direction away from the longitudinal centre of the channel. The end portions 39, 41 of the second flow channels 26 beyond the first flow channels 24 taper down towards parting walls 32a,32b. The parting walls 32a,32b have orifices 33 therethrough and the orifices in the ends 35, 37 of the second flow channels 26 coincide with orifices 33 in the parting walls 32a,32b. As the end portions 39, 41 of the second flow channels 26 taper down, this results in the first channels 24 being shorter than the second channels 26 and terminating at first and second ends 31 34.

The end portions 39, 41 of the second flow channels 26 may decrease in cross sectional area whilst maintaining the same shape, i.e. the dimensions thereof decrease whilst staying the same relative to one another. Alternatively, the end portions 39,41 of the second flow channels 26 may decrease in cross sectional area and have a different cross-sectional shape to the central portion 43 between the end portions 39, 41. For example, the second flow channels 26 may have a substantially diamond or rhombus cross-sectional shape (in the plane orthogonal to the longitudinal axis) in a portion 43 between the end portions 39, 41, but may have an oval or circular cross-sectional shape in the end portions 39, 41.

Alternatively, the end portions 39,41 of the second flow channels may have a cross-sectional shape that is different to the central portion 43 but has the same cross-sectional area. For example, the second flow channels 26 may have a substantially diamond or rhombus cross-sectional shape (in the plane orthogonal to the longitudinal axis) in a middle portion 43 between the end portions 39, 41, which may change to a circular or oval shape (in the end portions 39,41) having the same cross sectional area as the diamond or rhombus of the middle portion. The change in shape may be gradual or stepped.

The upstream ends of all of the first channels 24 are in fluid communication with each other, as the fluid 20 is able to flow around the reduced cross section ends of the second channels 24 and between the upstream ends of the first channels 24. The fluid 20 is unable to flow through parting wall 32a, as the orifices 33 therein are coincident with the openings into the second channels 26. A first inlet chamber 28a is therefore defined between the upstream ends of the first channels 24, the upstream parting wall 32a and the external housing of the heat exchanger. First inlet 12 is able to supply fluid 20 into the first inlet chamber 28a such that it can flow around the tapered ends of the second channels 26 and pass into the upstream ends of the first channels 24. First inlet 12 may be arranged to supply fluid into the top of the heat exchanger.

The housing of the heat exchanger and the parting wall 32a define a second inlet chamber 30a, located on the other side of the parting wall 32a to the channels 24,26. The second fluid is able to be supplied into the second inlet chamber 30a through second inlet 14.

Fluid 20 is able to flow out of the downstream ends of the first channels 24 and around the reduced diameter ends of the second channels 24. The fluid 20 is unable to flow through parting wall 32b, as the orifices therein are coincident with the downstream openings into the second channels 26. A first outlet chamber 28b is therefore defined between the downstream ends of the first channels 24, the downstream parting wall 32b and the external housing of the heat exchanger. First outlet 16 may be arranged to allow fluid to exit the bottom of the heat exchanger.

The housing of the heat exchanger and the downstream parting wall 32b define a second outlet chamber 30b, located on the other side of the parting wall 32b to the channels 24,26. The second fluid 22 is able to pass from the second flow channels 26 through the orifices in the downstream parting wall 32b and into the second outlet chamber. The second fluid 22 may then exit the heat exchanger through second outlet 18.

Figure 4:
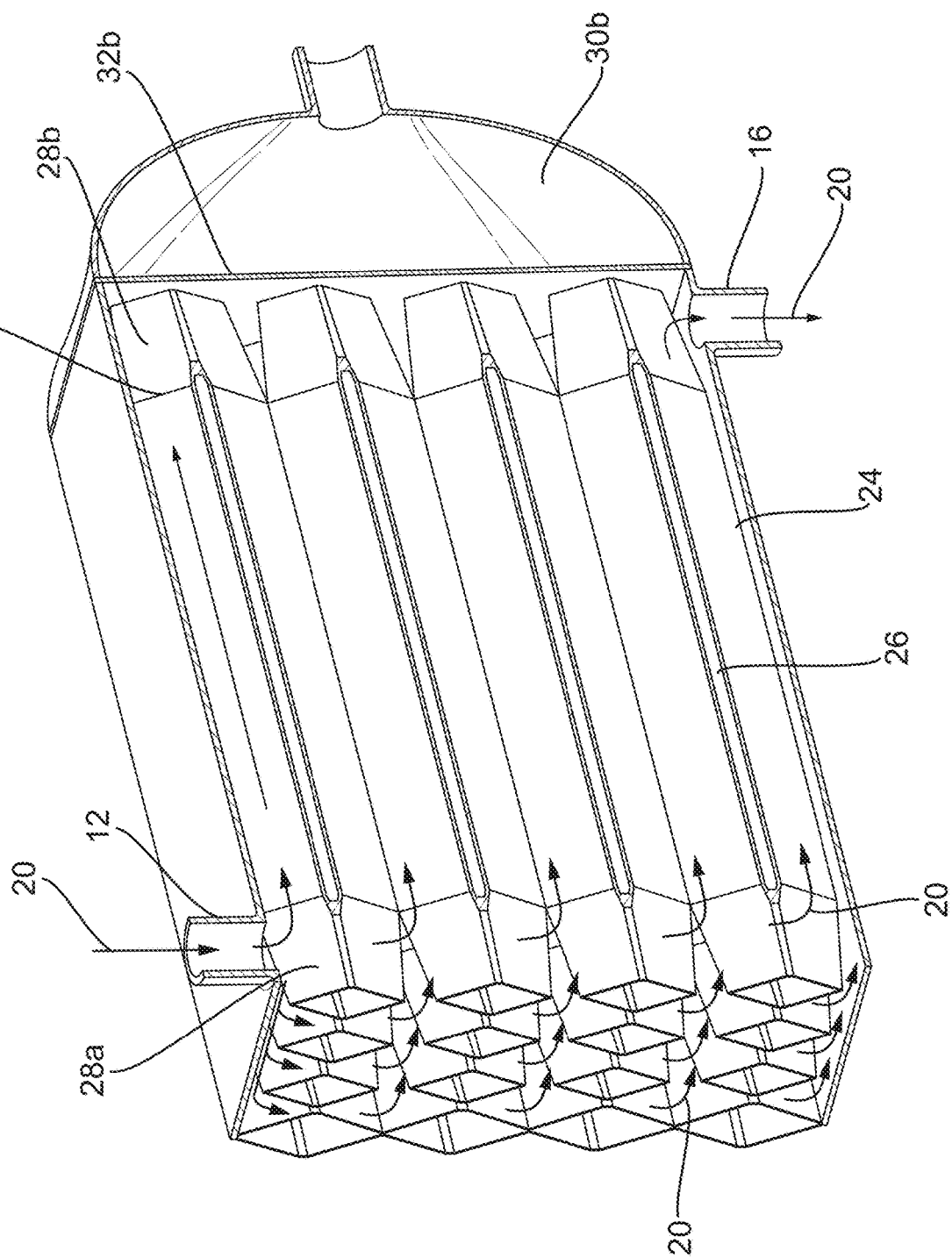
FIG. 4 shows a partial view of the heat exchanger of FIG. 1, showing the flow of a first fluid through the heat exchanger.

In operation, the first fluid 20 is supplied to the first inlet 12 and passes into the first inlet chamber 28a. The first fluid 20 flows around the outsides of the tapered, upstream ends of the second channels 26 so as to fill the first inlet chamber 28a. The first fluid 20 enters the upstream ends 31 of the first channels 24 and travels through these channels and out of their downstream ends 34 into the first outlet chamber 28b. The first fluid 20 is able to flow around the outsides of the tapered, downstream ends of the second channels 26 to the first outlet 16. The arrows in FIG. 4 show the above-described flow of the first fluid 20 through the heat exchanger. More specifically, FIG. 4 shows a view of the portion the heat exchanger of FIGS. 1-3 from the first inlet 12 to the downstream end. FIG. 4 shows a cross sectional view of this portion, that would be seen if the heat exchanger was cut along its length in a plane defined by the longitudinal axis and line D in FIG. 2.

Figure 5:
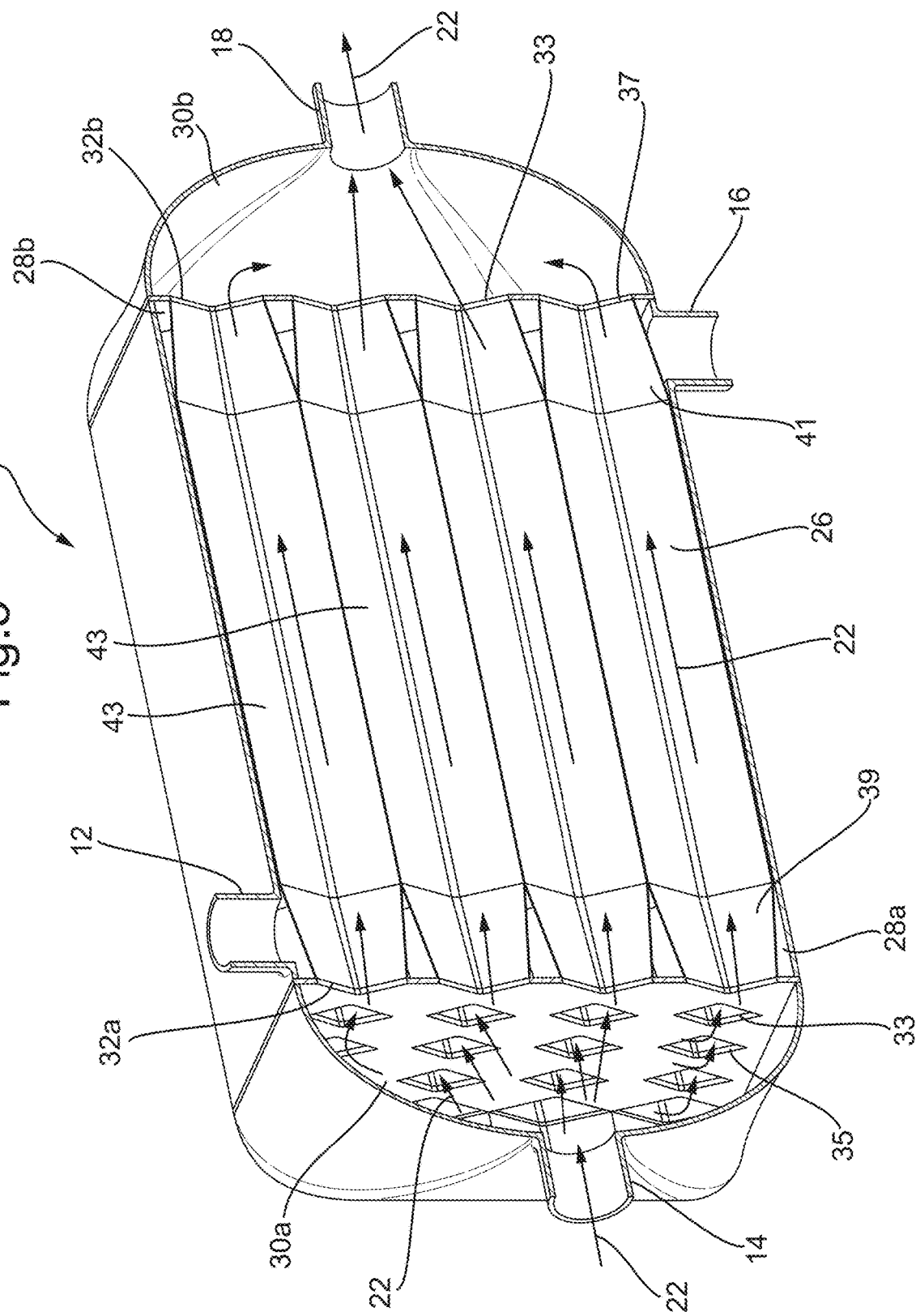
FIG. 5 shows a cross sectional view of the heat exchanger of Figure showing the flow of a second fluid through the heat exchanger.

FIG. 5 shows a cross section of the heat exchanger that would be seen if it was cut along its length in a plane defined by the longitudinal axis and line E in FIG. 2. This arrows in this Figure show the second flow path through the heat exchanger. The second fluid flows into the second inlet 14 and into second inlet chamber 30a. The fluid fills the second inlet chamber 30a and passes through the orifices 33 in the upstream parting plate 32a and into the second channels 26. The second fluid flows along the second channels 26 and passes out of the downstream ends 37 of these channels and into the second outlet chamber 30b. The second fluid 22 then passes out of the second outlet 18.

The first and second fluids flow through the heat exchanger simultaneously such that heat in one of the fluids is passed into the other fluid.

Whilst the Figures show straight longitudinal channels, i.e. having planar sides or surfaces, the channels may have various forms, such as wave channels (i.e. having waved sides or surface, such as sinusoidal waves). Such channels may induce turbulence in fluid flow therein.

The heat exchanger may be formed using any suitable manufacturing process. However, in preferred embodiments, the heat exchanger is formed using an additive manufacturing method such as 3D printing. The heat changer may be 3D printed from one longitudinal end thereof to the other.

An alternative embodiment may be substantially the same as that described above, aside from the end portions 39 of the second fluid channels being of a different cross-sectional shape to the rest of the channel. The orifices 33 in the parting walls 32a,32b are therefore also modified so as to have the same different cross-sectional shape as the end portions 39. The cross-sectional area in the end portions 39 may be the same as (or smaller than) the cross sectional area in the rest of the second fluid channels.

Figure 6:
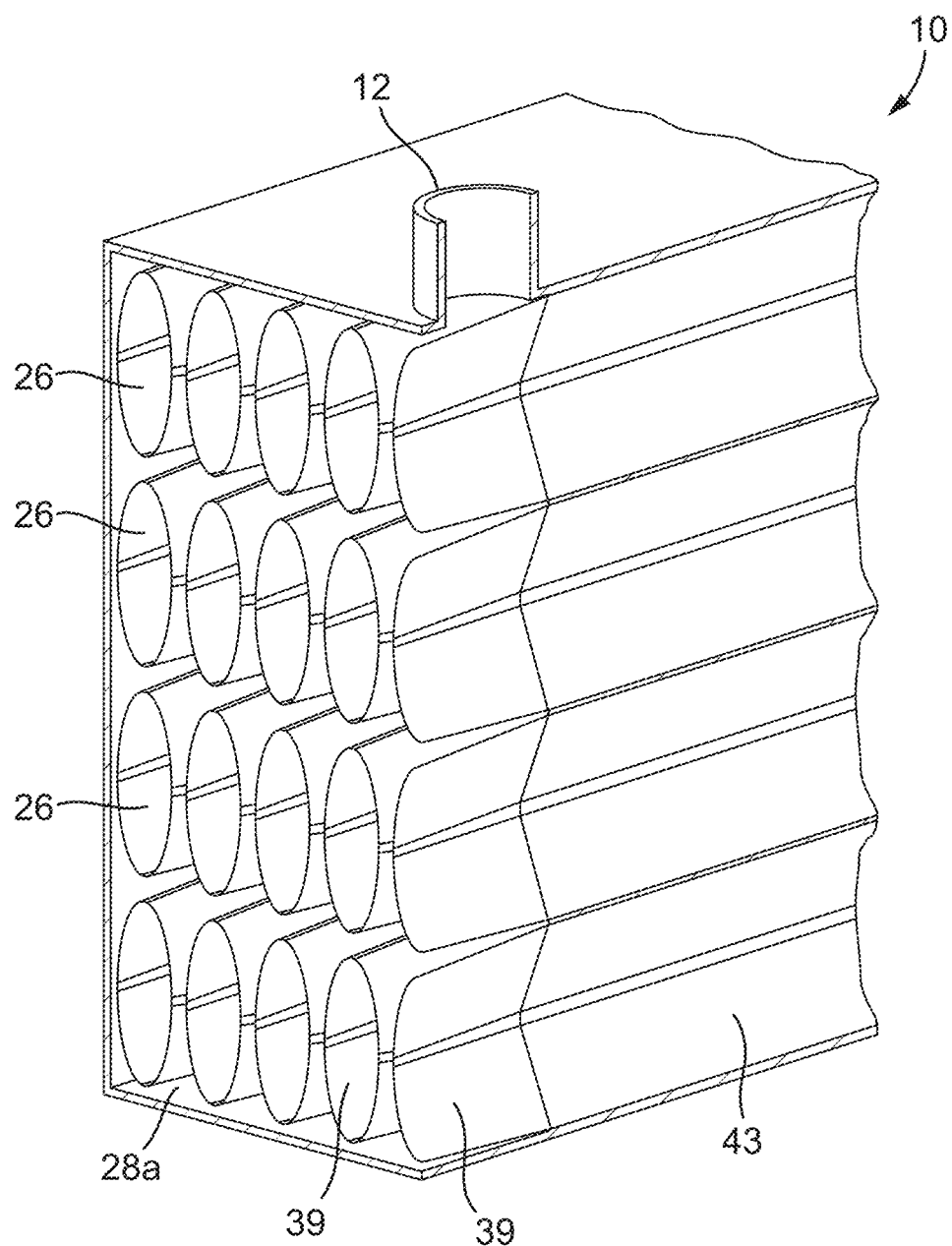
FIG. 6 shows a partial view of an alternative embodiment of a heat exchanger.

In the embodiment shown in FIG. 6, the longitudinally central portions 43 (i.e. the lengths between the end portions) of the second fluid channels 26 have rhombus shaped cross-sections, whereas the end portions 39 have oval shaped cross-sections. The cross sectional areas of each of the second fluid channels 26 may remain constant along its entire length. As such, a fluid pressure drop is prevented along the channels. Fluid is able to flow between the end portions 39 of the second fluid channels 26 in the first inlet chamber 28a, in the manner described above.

Although the present disclosure has been described with reference to various embodiments, it will be understood by those skilled in the art that various changes in form and detail may be made without departing from the scope of the invention as set forth in the accompanying claims.

For example, although the ends of the second flow channels are depicted as tapering gradually and progressively, they could alternatively step down in cross-section.

The invention claimed is:

1. A heat exchanger for exchanging heat between first and second fluids, comprising:
    first fluid channels extending in a longitudinal direction for carrying a first fluid; and
    second fluid channels extending in the longitudinal direction for carrying a second fluid;
    wherein the first and second fluid channels are arranged in an alternating pattern such that each of a plurality of the first fluid channels is located laterally between some of the second fluid channels and each of a plurality of the second fluid channels is located laterally between some of the first fluid channels;
    wherein walls of the plurality of the first fluid channels also form walls of the plurality of the second fluid channels, and the walls of the plurality of the second fluid channels also form the walls of the plurality of the first fluid channels, except for the first and second fluid channels located at the radial edges of the heat exchanger; and
    wherein the second fluid channels extend longitudinally beyond ends of the first fluid channels, and have end portions that decrease in cross sectional area such that the first fluid is able to pass around and between the ends portions of the second fluid channels;
    the heat exchanger further comprising an upstream parting wall contacting upstream ends of the second fluid channels, wherein a first inlet chamber is defined between the upstream parting wall, an outer housing of the heat exchanger and upstream ends of the first fluid channels, and wherein the outer housing comprises a first inlet into the first inlet chamber for supplying the first fluid.

2. The heat exchanger of claim 1, wherein each of the plurality of the first fluid channels has a first length, and each of the plurality of the second fluid channels has a second length, wherein the second length is greater than the first length.

3. The heat exchanger of claim 1, wherein each of the plurality of the second fluid channels tapers, or otherwise changes, to a smaller cross sectional area beyond the ends of the first fluid channels.

4. The heat exchanger of claim 1, wherein the cross sections of the plurality of the first fluid channels are substantially rhombus shaped; and wherein the cross sections of the plurality of the second fluid channels are substantially rhombus shaped at least for the portions of their lengths that extend between the ends of the first fluid channels.

5. The heat exchanger of claim 1, wherein each of the second fluid channels has a different cross-sectional shape in its end portions to the cross-sectional shape in its central portion between the end portions.

6. The heat exchanger of claim 1, comprising a second inlet chamber on an opposite side of the upstream parting wall to the first inlet chamber, wherein the upstream parting wall has orifices therein such that the second fluid supplied to the second inlet chamber can pass through the upstream parting wall, into and through the second fluid channels.

7. The heat exchanger of claim 6, comprising a second inlet in the outer housing of the heat exchanger for supplying the second fluid into the second inlet chamber.

8. The heat exchanger of claim 1, comprising a downstream parting wall contacting downstream ends of the second fluid channels, wherein a first outlet chamber is defined between the downstream parting wall, the outer housing of the heat exchanger and downstream ends of the first fluid channels, and wherein the outer housing comprises a first outlet from the first outlet chamber.

9. The heat exchanger of claim 8, comprising a second outlet chamber on an opposite side of the downstream parting wall to the first outlet chamber, wherein the downstream parting wall has orifices therein such that the second fluid exiting the second fluid channels can pass into the second outlet chamber.

10. The heat exchanger of claim 9, wherein the outer housing comprises a second outlet arranged to allow the second fluid to exit the second outlet chamber.

11. A heat exchanger for exchanging heat between first and second fluids, comprising:
    first fluid channels extending in a longitudinal direction for carrying a first fluid; and
    second fluid channels extending in the longitudinal direction for carrying a second fluid;
    wherein the first and second fluid channels are arranged in an alternating pattern such that each of a plurality of the first fluid channels is located laterally between some of the second fluid channels and each of a plurality of the second fluid channels is located laterally between some of the first fluid channels;
    wherein walls of the plurality of the first fluid channels also form walls of the plurality of the second fluid channels, and the walls of the plurality of the second fluid channels also form the walls of the plurality of the first fluid channels, except for the first and second fluid channels located at the radial edges of the heat exchanger; and
    wherein the second fluid channels have end portions that extend longitudinally beyond ends of the first fluid channels, and wherein one or both of the end portions of each second fluid channel has a different cross sectional shape to the portion of the second fluid channel between the end portions and such that the first fluid is able to pass around and between the end portions of the second fluid channels.

12. The heat exchanger of claim 11, wherein the portion of the second fluid channel between the end portions has a rhombus shaped cross-section, and at least a portion of one or both of the end portions has an oval or circular shaped cross-section.

13. A method of forming the heat exchanger of claim 11, comprising forming the heat exchanger in the longitudinal direction using additive manufacturing.

14. The method of claim 13, wherein the additive manufacturing is 3D printing.

* * * * *